United States Patent [19]
Davis et al.

[11] Patent Number: 5,809,006
[45] Date of Patent: Sep. 15, 1998

[54] OPTICAL DISK WITH COPY PROTECTION, AND APPARATUS AND METHOD FOR RECORDING AND REPRODUCING SAME

[75] Inventors: Hedley C. Davis, Fremont; Craig A. Nelson, Aptos; Glenn J. Keller, Los Gatos, all of Calif.

[73] Assignee: Cagent Technologies, Inc., Redwood City, Calif.

[21] Appl. No.: 655,961

[22] Filed: May 31, 1996

[51] Int. Cl.⁶ .................................................. G11B 7/00
[52] U.S. Cl. .................... 369/275.4; 369/50; 369/44.13
[58] Field of Search ............................... 369/275.1, 275.2, 369/257.3, 275.4, 44.13, 44.26, 58, 54, 50

[56] References Cited

U.S. PATENT DOCUMENTS

| | | | |
|---|---|---|---|
| 4,375,088 | 2/1983 | de Haan et al. | 365/234 |
| 4,807,211 | 2/1989 | Getreuer | 369/44 |
| 4,807,214 | 2/1989 | Getreuer | 369/46 |
| 4,901,300 | 2/1990 | Van Der Zande et al. | 369/47 |

(List continued on next page.)

FOREIGN PATENT DOCUMENTS

| | | |
|---|---|---|
| 1005263A6 | 6/1993 | Belgium . |
| 0 352 105 A2 | 1/1990 | European Pat. Off. . |
| 0 565 731 A1 | 10/1993 | European Pat. Off. . |
| 0 587 373 A1 | 3/1994 | European Pat. Off. . |

(List continued on next page.)

OTHER PUBLICATIONS

Asthana, P.; Finkelstein, B., "Superdense Optical Storage", IEEE Spectrum (Aug. 1995), pp. 25–31.

Bryd, G.T.; Holliday, M.A., "Multithreaded Processor Architectures", IEEE Spectrum (Aug. 1995), pp. 38–46.

Lubell, P.D., "The Gathering Storm in High–Density Compact Disks", IEEE Spectrum (Aug. 1995), pp. 32–37.

Pohlmann, K.C., "Principles of Digital Audio" (1994), 2nd. ed., pp. 321–373.

*Primary Examiner*—Nabil Hindi
*Attorney, Agent, or Firm*—Fenwick & West LLP

[57] ABSTRACT

Copy-protected optical disk format, optical disk recording apparatus for creating disks having such formats and optical disk reading apparatus for reading disks having such formats and for determining whether the disks are authentic. In one aspect, an authentic optical disk has data bit indications along a spiral centerline of the disk, and these data bit indications define a radial wobble which has substantially greater energy at a predefined frequency $f_{CPW}$ (such as $f_{CC}/392$) than at a frequency of $f_{CC}/196$, where $f_{CC}$ is the spatial channel clock frequency. In another aspect, an authorized optical disk has data bit indications along a substantially spiral centerline of the disk, according to a channel clock whose frequency varies across the disk. The disk further has stored thereon an indication of the number of such channel clock cycles which occur along a predetermined test segment of the centerline, optionally together with a pointer to the test segment. Since normal data stream copying techniques do not copy the exact channel clock rates on the disk, and since the copying equipment will inherently introduce its own channel clock variations across the resulting disk, the predetermined test segment on the copy will not have the number of channel clocks as that specified by the data indicating the number of channel clock cycles to expect along the test segment.

37 Claims, 11 Drawing Sheets

U.S. PATENT DOCUMENTS

| | | |
|---|---|---|
| 4,972,401 | 11/1990 | Carasso et al. ............................ 369/59 |
| 4,975,898 | 12/1990 | Yoshida .................................. 369/100 |
| 5,109,369 | 4/1992 | Maeda et al. ............................. 369/50 |
| 5,191,571 | 3/1993 | Fukumoto et al. .................. 369/44.37 |
| 5,270,991 | 12/1993 | Verboom ............................. 369/44.26 |
| 5,297,125 | 3/1994 | Yamagami et al. .................. 369/44.13 |
| 5,383,169 | 1/1995 | Shinoda et al. ...................... 369/44.13 |
| 5,436,770 | 7/1995 | Muto et al. ............................... 360/51 |
| 5,463,614 | 10/1995 | Morita ................................. 369/275.4 |
| 5,537,373 | 7/1996 | Horikiri .............................. 369/44.13 |
| 5,539,724 | 7/1996 | Ohtomo .............................. 369/275.4 |
| 5,570,339 | 10/1996 | Nagano ............................... 369/275.4 |

FOREIGN PATENT DOCUMENTS

| | | |
|---|---|---|
| 0 595 349 A1 | 5/1994 | European Pat. Off. . |
| 0 623 921 A1 | 11/1994 | European Pat. Off. . |
| 0 637 023 A1 | 2/1995 | European Pat. Off. . |
| 43 08 680 A1 | 10/1993 | Germany . |
| 63-87655 | 4/1988 | Japan . |
| 63-144429 | 6/1988 | Japan . |
| 63-146233 | 6/1988 | Japan . |
| 64-35727 | 2/1989 | Japan . |
| 1-302575 | 12/1989 | Japan . |
| 1-317239 | 12/1989 | Japan . |
| 7-14311 | 1/1991 | Japan . |
| 3-76041 | 4/1991 | Japan . |
| 3-156774 | 7/1991 | Japan . |
| 4-69868 | 3/1992 | Japan . |
| 4-248137 | 9/1992 | Japan . |
| 4-354022 | 12/1992 | Japan . |
| 4-372724 | 12/1992 | Japan . |
| 5-73929 | 3/1993 | Japan . |
| 5-109117 | 4/1993 | Japan . |
| 5-128621 | 5/1993 | Japan . |
| 5-189934 | 7/1993 | Japan . |
| 5-250707 | 9/1993 | Japan . |
| 5-258469 | 10/1993 | Japan . |
| 5-290383 | 11/1993 | Japan . |
| 5-290385 | 11/1993 | Japan . |
| 5-307782 | 11/1993 | Japan . |
| 5-314562 | 11/1993 | Japan . |
| 5-314670 | 11/1993 | Japan . |
| 6-60575 | 3/1994 | Japan . |
| 6-89442 | 3/1994 | Japan . |
| 6-195851 | 7/1994 | Japan . |
| 6-243498 | 9/1994 | Japan . |
| 6-309672 | 11/1994 | Japan . |
| A 9101358 | 3/1993 | Netherlands . |

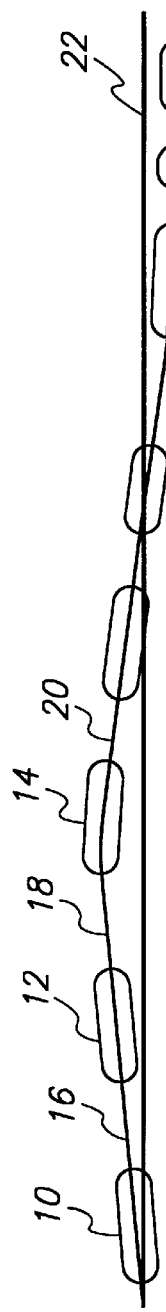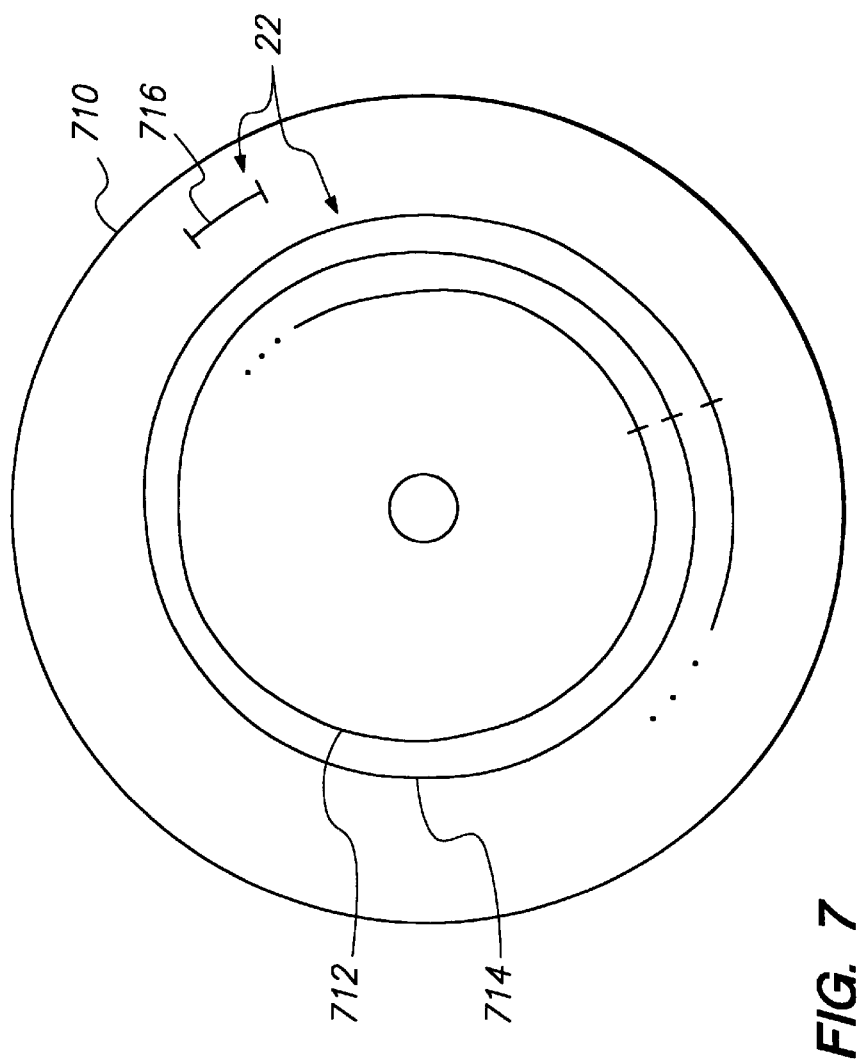

OPTICAL DISK WITH COPY PROTECTION, AND APPARATUS AND METHOD FOR RECORDING AND REPRODUCING SAME

BACKGROUND OF THE INVENTION

1. Field of the Invention

The invention relates to copy protection mechanisms for optical disks.

2. Description of Related Art

An optical disk, such as an audio CD, a CD-ROM, or a "write once" optical disk (known as "CD-WO"), has data recorded on it along a substantially spiral centerline beginning at an interior radius and continuing out to larger radii. Data is recorded on the disk in the form of bit indications consisting of lands and pits alternating along the centerline, the arcuate length of each land or pit indicating the number of sequential "zero" bits in the data. The data to be recorded on the disk is converted from binary to a format known as eight-to-fourteen modulation (EFM), which guarantees that all runs of zeroes will be at least two but no more than 10 bits in length. The EFM data is written at a constant linear velocity (CLV) along the spiral, such that each '1' in the EFM data produces a transition from land to pit or vice versa, and each '0' in the EFM data produces no transition. Since the EFM data is provided to the recording apparatus at a fixed bit rate (known as a channel clock frequency), and since the recording takes place at a constant linear velocity, the pits and lands will each have an arcuate length which is between 3 $T_{CC}$ and 11 $T_{CC}$, inclusive, where $T_{CC}$ can be thought of as a channel clock period expressed in units of arcuate length.

Specifically, for a nominal 1×speed optical disk drive, the data bit rate is specified to be 4.3218 million channel bits per second. A 1× disk drive spins at a constant linear velocity of 1.2–1.4 meters per second CLV, depending on program length. Thus expressed in channel clock cycles per unit of arcuate length, the channel clock frequency is approximately 3.087 channel clock cycles per arcuate micron (for a recording speed of 1.4 meters per second), and 3.6015 channel clock cycles per arcuate micron (for a recording speed of 1.2 meters per second).

Manufacturers have developed optical disk reproduction (i.e., playback or reading) equipment which spin the disk at 2×, 4×, 6× or more times the nominal 1×speed of 1.2–1.4 arcuate meters per second. It is therefore useful to speak of channel clocks in terms of cycles per unit of arcuate length on the disk because whereas the temporal frequency of the data stream to or from the disk is higher at higher disk spin rates, the spatial channel clock frequency of the data as recorded on the disk remains constant.

Background on encoding, recording, pressing and playback methods and systems for optical disks can be found in Chapter 12 of Pohlmann, "Principles of Digital Audio", Second Edition (1994), incorporated herein by reference.

Common manufacturing processes for optical disks begin with a glass plate which is coated with a photoresist (or with some other selectively removable material). The disk is spun in a "cutting" machine, and a writing beam (such as a laser beam or an ion beam) traverses the spiral path from the inside of the disk to the outside of the disk. The cutting machine modulates the writing beam in response to an EFM signal arriving from a digital master source, as the beam traverses the disk. If the selectively removable material was a photoresist, the disk is then developed. At this point, the material exhibits the desired lands and pits along the spiral centerline. As described in more detail in Pohlmann, a number of metal stamper disks are created from the glass master, and the stampers form the desired pits and lands into plastic disks in an injection molding process. Thus the pits and lands that appear on a final optical disk have the same arcuate lengths as was dictated by the arriving EFM data bit rate and the linear velocity of the glass master disk spinning in the cutting machine.

The pits and lands alternating along the spiral centerline of the resulting optical disk define alternating arcuate regions of high and low reflectivity which can be sensed by a pickup device in an optical disk reader. In an optical disk reader, the disk is spun at the nominal 1.2–1.4 meters per second CLV (the same as the spin rate at which the disk was originally recorded), or at a higher rate for 2×, 4×, etc. disk drives. A read head traverses the spiral centerline of the disk, directing a laser beam thereon and sensing the reflections. The channel clock frequency is recovered from the sensed reflections in a well known manner, for example by using a phase locked loop. See, for example, Muto U.S. Pat. No. 5,436,770, entitled "DISC RECORDING AND/OR REPRODUCING APPARATUS HAVING AN ENLARGED LOCKING RANGE FOR CORRECTLY PHASED INTERNAL CHANNEL CLOCKS", incorporated by reference herein.

The channel clock frequency recovered from the sensed reflections is used to control the constant linear velocity of the spin rate, as well as to clock the EFM data into appropriate processing circuitry for converting it back into binary form.

As described more fully in Pohlmann, the read head is maintained on the spiral centerline of the disk through a closed loop control system. If the read head wanders off the track centerline (or the centerline deviates from circular), a change in the reflected light takes place. This change is detected by the optical disk playback equipment, which produces a tracking error signal. The tracking error signal is fed back to a head-positioning mechanism which adjusts the position of the read head radially, until the tracking error returns to 0. The bandwidth of the tracking servo system is on the order of 100 Hz.

A CD-WO format optical disk is similar to a CD-audio or CD-ROM disk in its use of a spiral centerline, alternating regions of high and low reflectivity along the centerline for recorded data, EFM data encoding, and spatial channel clock frequency. A blank CD-WO disk is pre-grooved to enable the recorder to track a proper spiral. The pre-groove also contains a radial groove wobble having a frequency of 22.05 kHz (for a 1×speed drive), and timecode addressing information is frequency modulated thereon. In terms of spatial frequency, the write-only groove wobble frequency translates to $f_{CC}/196$, where $f_{CC}$ is the spatial channel clock frequency. That is, the wobble completes one cycle in every 196 channel clock cycles along the centerline. The CD-WO format, including its pre-groove wobble, is described in detail in Van Der Zande U.S. Pat. No. 4,901,300, incorporated by reference herein. The 22.05 kHz wobble frequency is advantageous for the facility of its use to control the recording spin rate. In particular, the spin rate can be controlled by comparing the phase of the groove wobble with the phase of a reference signal of a frequency which can be derived simply by dividing down the 4.3218 MHz data bit rate frequency. Additionally, the 22.05 kHz frequency is outside the frequency band required for recording the EFM signal, thereby avoiding interaction between the wobble signal and the EFM signal. It is also outside the frequency band of the tracking servo system, thereby minimizing any effect on tracking.

Producers of optical disk titles spend a large amount of capital and resources in developing unique and valuable information. In order to encourage such producers to provide such information, they must be able to anticipate a reasonable rate of return. Producers achieve a rate of return by selling disks in large volume, and/or by licensing others to sell authorized copies in large volume. Unfortunately, there is presently a risk that third-party counterfeiters or pirates will illegally or improperly copy optical disks and sell them, undermining the return on the investment which the rightful producer should reasonably be able to expect. With the risk of unauthorized copying, legitimate producers may not be able to earn an adequate return on their investment, ultimately leading to higher prices and reduced varieties of available CD-ROM titles.

The methods which can be used by pirates to illegally copy optical disks can be divided into two primary categories: image copying and data stream copying. In image copying techniques, a legitimate optical disk is chemically and/or lithographically converted or copied to a new mastering disk. The new mastering disk is then used to press any desired number of copies. In the data stream copying techniques, the data on a legitimate optical disk is read from the disk linearly, for example using an ordinary optical disk player. The data stream is either maintained in EFM form, or is translated to binary and later back to EFM form. Either way, the resulting EFM data stream is provided to a cutting machine for cutting a new master. The new master is then used to press any desired number of illegal copies. Alternatively, the EFM data stream can be provided to a CD-WO recorder for simply recording an illegal copy directly. It is the later category of pirating, that is data stream copying, that is addressed by the present invention.

A number of techniques have been developed for preventing unauthorized or illegal data stream copying of optical disks. One such technique provides for optical disks to be manufactured with a copy protection code at a predetermined location on the disk. Many data stream copying techniques for pirating disks do not read this location of the disk. Thus the illegal copy will not contain the code at the proper location. Optical disk readers are then designed to reject any disk that does not have the copy protection code at the proper location on the disk.

The above copy protection technique suffers from the problem that it does not prevent copying by a device which copies all of the data on the disk, including the copy protection code. Such devices exist or are easily constructed. Illegal copies made from such machines are not distinguishable from legal copies by examination of the copy protection code.

Another technique that has been proposed for preventing serial data copies involves including a serial copy management code in the table of contents (TOC) area of the disk. This method, known as the "serial copy management system" (SCMS), allows copying only if the SCMS code on the disk so indicates. When a disk for which copying is allowed is copied, the copying machine is supposed to change the SCMS code to a code which indicates that no further copies are permitted. Copying machines are supposed to preclude copying of any disk which already has an SCMS code indicating that no further copies are permitted.

The SCMS technique suffers from the same problems as the first-mentioned copy protection technique above. In particular, the technique is easily undermined by a copying machine which reads and transmits all of the data from the original disk unchanged, including the original SCMS code.

Another series of techniques for preventing unauthorized serial data stream copying of optical disks is described in published European patent application Ser. No. 94302516.3, Publication No. 0 637 023 A1, filed Apr. 11, 1994, inventor Ozaki, incorporated by reference herein in its entirety. In Ozaki, optical pits which are irregularly shaped are written intermittently throughout the optical disk. Special hardware and software for writing the irregularly shaped pits is required. Additionally, complex hardware and software may be necessary to detect the various irregularly shaped pits and arrangements at specified frames on the disk, in order to determine whether or not the disk is an authorized copy.

Accordingly, there is a need for an optical disk format, as well as corresponding recording and reproduction apparatus, which is able to prevent the illegal or unauthorized serial data type copying of optical disks without requiring complex hardware and software reproduction devices and/or irregularly shaped pits on the optical disk, and which will not be defeated by a copying machine that is able to read and transmit all of the data on the disk.

SUMMARY OF THE INVENTION

The invention involves a number of unique optical disk formats, as well as optical disk recording apparatus for creating disks having such formats and optical disk reading apparatus for reading disks having such formats and for determining whether the disks are authentic. In one aspect, roughly described, an optical disk has data bit indications along a spiral centerline of the disk, and these data bit indications define a radial wobble which has substantially greater energy at a predefined frequency $f_{CPW}$ than at a frequency of $f_{CC}/196$. In another aspect, the radial wobble has substantially greater energy at a frequency $f_{CPW}$, than at a predefined reference frequency $f_{REF}$, where $f_{CPW}$ is approximately equal to an integer sub-harmonic of $f_{CC}/196$. In an embodiment, the wobble has substantially greater energy at $f_{CC}/392$ than at $f_{CC}/196$. Since normal data stream copying methods do not copy wobble patterns, the absence of the proper wobble pattern on a disk can easily be detected by an optical disk reader to expose an unauthorized copy.

In another aspect of the invention, usable separately or together with one of the wobble aspects just described, an optical disk has data bit indications along a substantially spiral centerline of the disk, according to a channel clock whose frequency varies across the disk. In one embodiment, the channel clock variations are introduced intentionally by the recording equipment, whereas in another embodiment, the channel clock variations are merely those which are inherent in any conventional disk recording apparatus. The disk further has stored thereon an indication of the number of such channel clock cycles which occur along a predetermined test segment of the centerline, optionally together with a pointer to the test segment. The data can be stored on the disk in a number of ways, such as in normal data at a predetermined address on the disk, or in a subcode channel, or as an encoding on a wobble pattern. Since normal data stream copying techniques do not copy the exact channel clock rates on the disk, and since the copying equipment will inherently introduce its own channel clock variations across the resulting disk, the predetermined test segment on the copy will not have the number of channel clocks as that specified by the data indicating the number of channel clock cycles to expect along the test segment. An optical disk reader can easily detect this discrepancy to identify an unauthorized copy disk.

BRIEF DESCRIPTION OF THE DRAWINGS

FIG. 1 illustrates a portion of a track on an optical disk incorporating an aspect of the present invention.

FIG. 7 is a plan view of an optical disk according to the invention.

DETAILED DESCRIPTION

I. EMBODIMENT 1—WOBBLE PATTERN

Figure 2:
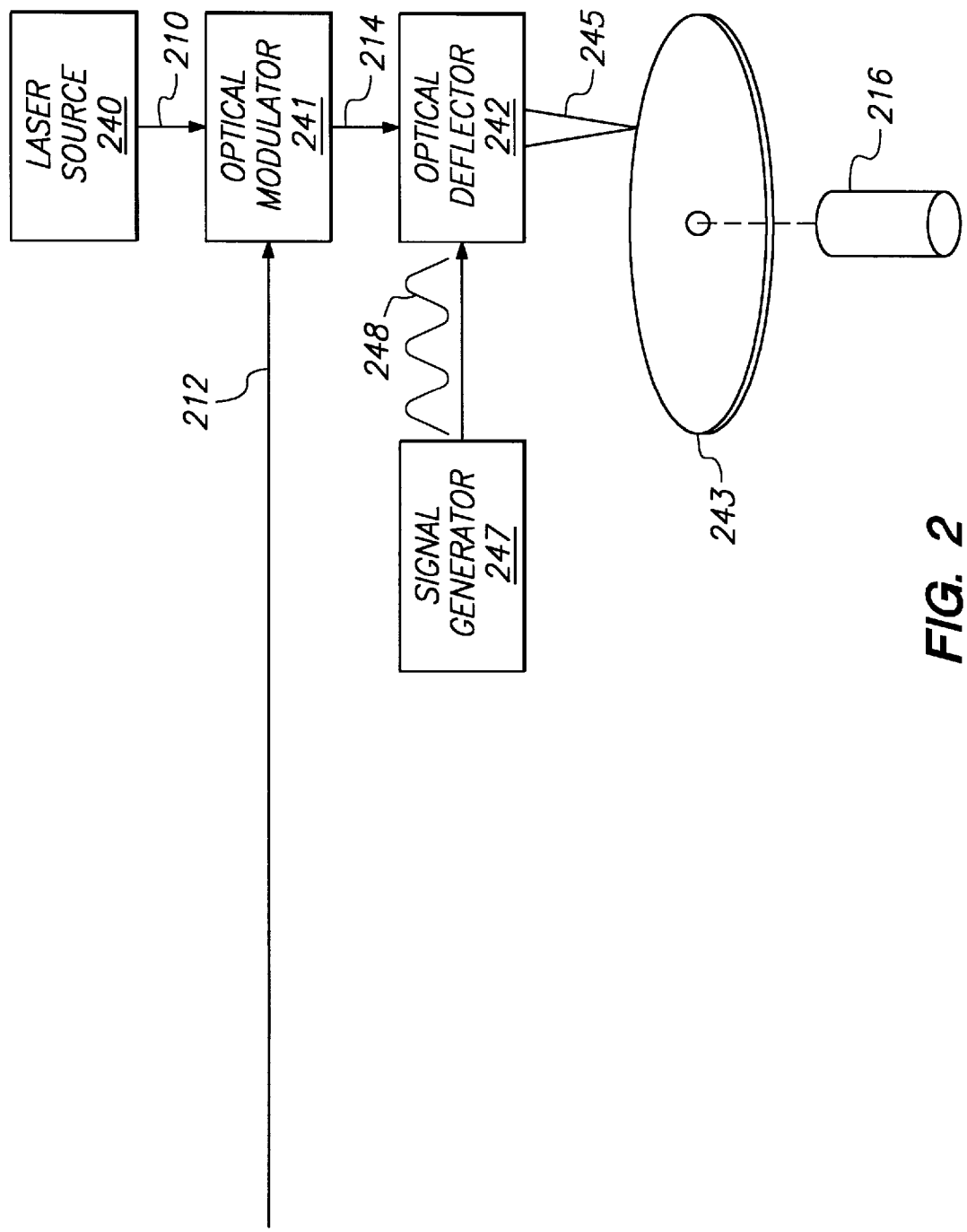
FIGS. 2–4 and 8 are block diagrams of optical disk recording devices according to the invention.

A. Optical Disk Format optical disk incorporating an aspect of the present invention. It comprises a series of pits 10, 12, 14 and so on, alternating with land regions 16, 18, 20, and so on, all formed along (and defining) a virtual or nominal centerline 22. The centerline 22 traverses a substantially spiral path across the disk, deviating from a pure spiral only by manufacturing tolerances, if any. Only a very small segment of the spiral centerline is shown in FIG. 1.

The pits and lands illustrated in FIG. 1 are considered herein to be "bit indications", because they indicate the bit pattern of data recorded on the disk. Viewed from the opposite side of the disk, these bit indications appear as alternating lands and bumps. In other embodiments, such as in certain erasable optical disk technologies, the bit indications may be made up of other kinds of features, such as alternating light and dark regions, alternating reflective and light-scattering regions, and so on.

The pits 10, 12 and 14 in the embodiment of FIG. 1 all have a standard width, in conformity with conventional optical disks. However, as shown in FIG. 1, the centers of the pits deviate slightly, radially about the virtual centerline 22, thereby appearing to "wobble". The wobble pattern is similar to the CD-WO pre-groove wobble pattern described in the above-incorporated Van Der Zande patent, except that the frequency of wobble is approximately 11.025 kHz for a 1×speed disk drive, which translates to approximately one cycle of wobble per 392 channel clock cycles. In an embodiment, the wobble frequency on the disk is exactly 11.025 kHz (for a 1×disk drive) or one cycle per 392 channel clock cycles.

When the disk is read, the centerline tracking mechanism will produce a tracking error signal which matches the wobble pattern. The frequency of 11.025 kHz is too high for the tracking system to actually move the head radially in accordance with the wobble, but the deviation of the pits from the centerline 22 is kept small enough such that lands and pits are still detected reliably by the laser pickup light sensor even at the maximum deviation from the centerline 22. The frequency of 11.025 kHz is selected in order to take advantage of existing software and hardware which detects the 22.05 kHz wobble (which translates to $f_{CC}/196$, where $f_{CC}$ is the spatial channel clock frequency) used on a CD-WO optical disk. Such hardware and software requires only small modifications or additions in order to detect an 11.025 kHz wobble. Indeed, wobbles having an approximate frequency equal to any integer sub-harmonic of 22.05 kHz (i.e., any integer sub-harmonic of $f_{CC}/196$) can benefit from existing hardware and software.

Only legal or authorized copies of an optical disk have the wobble pattern having the predefined wobble copy protection frequency of $f_{CPW}=f_{CC}/392$. If a counterfeiter attempts to make a serial data-type copy of the disk, without special equipment for wobbling the write head radially at the proper frequency, the resulting copy will not exhibit the proper wobble. The reading apparatus detects whether an optical disk is authorized or not by determining whether the frequency spectrum of the tracking error signal, upon reading the disk, contains sufficient energy at the predefined wobble copy protection frequency $f_{CPW}$. If so, then the disk is considered authentic. If not, then the reading apparatus asserts an "alarm" signal. In response to the alarm signal, the apparatus can reject the disk, shut down, provide an audible or visible error message, or anything else that is appropriate.

It has been discovered that merely detecting whether the energy at $f_{CPW}$ exceeds a predefined absolute threshold, may not be sufficient to reliably determine authenticity of the disk. It has been found that noise and other effects can sometimes produce energy at $f_{CPW}$ even on unauthorized disks which do not have the proper wobble pattern. In particular, the tracking error signal used by the playback device to detect the wobble is merely a binary tracking zero crossing signal. This is a binary signal indicating which side of center the pickup is on. The signal is very noisy, containing energy in many frequency bands, and subject to unpredictable factors such as vibration, dust, playback unit manufacturing tolerances, eccentricity of rotation, and so on. As such, detection of the absolute energy content in the wobble pattern at $f_{CPW}$ is not a very reliable way to detect whether the disk is an authorized copy.

Therefore, in an embodiment of the invention, the playback unit determines authenticity by comparing the energy of the tracking error signal at the copy protection frequency $f_{CPW}=f_{CC}/392$, to the energy in the tracking error signal at some other reference frequency $f_{REF}$. The disk is determined to be authentic only if the ratio of energy at $f_{CPW}$ is substantially greater than the energy at $f_{REF}$. For example, the disk may be determined to be authentic only if the energy at $f_{CPW}$ exceeds 2.0 times the energy at $f_{REF}$. In a further embodiment, the reference frequency $f_{REF}$ is equal to the CD-WO wobble frequency $f_{WO}$. Thus the system rejects the disk if the energy of the error signal at approximately $f_{CC}/196$ is greater than a predefined factor times the energy at $f_{CC}/392$.

In the embodiment of FIG. 1, the wobble pattern is consistent along the entire spiral centerline along which data is recorded. This permits detection of unauthorized copies to be continuous, rather than only intermittent. In addition, both the recording and reading apparatus are greatly simplified since no mechanism is required for writing or reading the wobble pattern only at particular positions along the spiral centerline. However, in another embodiment, the wobble pattern is present only intermittently along the length of the spiral centerline 22.

Additionally, note that the wobble pattern in the embodiment of FIG. 1 follows a relatively pure sinewave pattern about the centerline 22. In an embodiment, this sinewave pattern can be considered a carrier frequency, and data can be encoded thereon, for example by phase, frequency or amplitude modulation.

B. Mastering Apparatus

FIG. 2 is a block diagram of one embodiment of a recording device for producing an optical disk master exhibiting the wobble pattern of FIG. 1. Another embodiment might use an ablation writing technique instead of a laser and photoresist technique. Referring to FIG. 2, a laser source 240 produces a writing beam 210. The beam 210 is modulated by an optical modulator 241 in response to the EFM signal arriving over a signal line 212. The resulting modulated beam 214 turns on or off in response to the ones and zeroes in the EFM signal arriving on line 212. The modulated beam 214 next passes through an optical deflector 242, the output 245 of which illuminates a spot on the photoresist of the glass master 243 spinning below. The write head (comprising the laser source 240, the optical modulator 241 and the optical deflector 242) traverses a spiral path from an inside radius of the disk 243 to an outside radius of the disk 243, and a spindle motor 216 spins the disk 243 at a constant linear velocity relative to the writing head. As shown in FIG. 2, the optical deflector 242 deflects the beam 245 very slightly radially in response to a wobble signal 248 generated by a signal generator 247. Note that whereas FIG. 2 shows the write head projecting the writing beam onto one surface of the disk 243, another embodiment could just as easily project it onto the other surface. Additionally, note that as used herein, a write head moveable radially "relative to" a disk includes an embodiment in which the write head moves and the disk remains stationary (except for its spin), and also includes an embodiment in which the write head remains stationary and the disk moves. It is only the "relative" radial movement that is significant.

The signal generator 247 contains a free running oscillator, the output of which provides the wobble control signal 248. Since the cutting machine in FIG. 2 spins the disks 243 at only 1×speed, the oscillator in signal generator 24 produces the signal 248 to oscillate at 11.025 kHz.

As previously described, the wobble pattern on the disk can include data encoded thereon, such as by frequency, phase or amplitude modulation of the oscillating pattern. Therefore, in another embodiment to FIG. 2, the signal generator 247 receives the data to be encoded onto the wobble pattern and modifies the wobble signal 248 in response thereto. The optical deflector 242 deflects the beam 245 radially in accordance with the wobble signal 248, and the desired pattern is recorded on the disk 243.

After the entire disk 243 is recorded, the photoresist is developed, stamper disks are formed, and plastic optical disks are mass produced, all in a conventional manner. The resulting optical disks contain wobble patterns such as that shown in FIG. 1.

Figure 3:
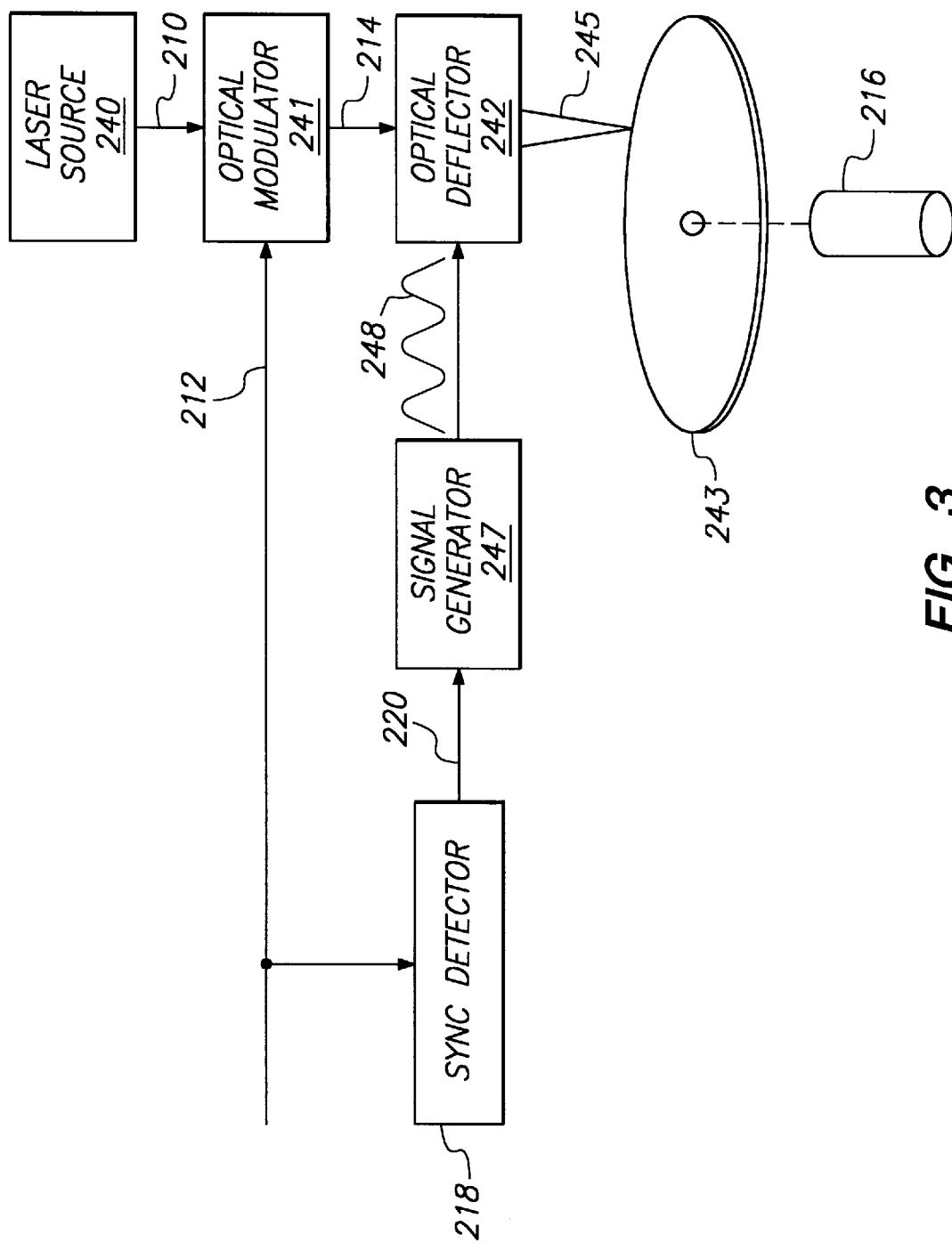

FIG. 3 illustrates another cutting machine similar to that of FIG. 2. The only difference is that the machine in FIG. 3 includes a sync detector 218 which has an input connected to receive the EFM signal 212, and an output connected to the signal generator 247. As described in more detail in the above-incorporated Pohlmann book, the bit stream of the EFM signal 212 is divided into frames, each of which includes a synchronization (sync) field. The sync field appears at a rate of once every 588 channel clock cycles of the EFM signal 212, and is typically used by an optical disk reader to ensure that it is spinning the disks at the desired constant linear velocity. In the embodiment of FIG. 3, sync detector 218 detects these sync fields and provides a sync timing signal 220 to signal generator 247 when they occur. The signal generator 247 resets the oscillator in response to the sync timing signal, thereby ensuring that the frequency of wobble signal 248 has the proper relationship to the channel clock frequency $f_{CC}$ as it appears on the disk 243. In another embodiment, the sync timing signal is provided as a reference signal to a phase locked loop, which then produces the wobble signal 248 at the proper frequency. In yet another embodiment, the channel clock itself is recovered from the EFM signal 212 and used to produce the wobble signal 248.

Figure 4:
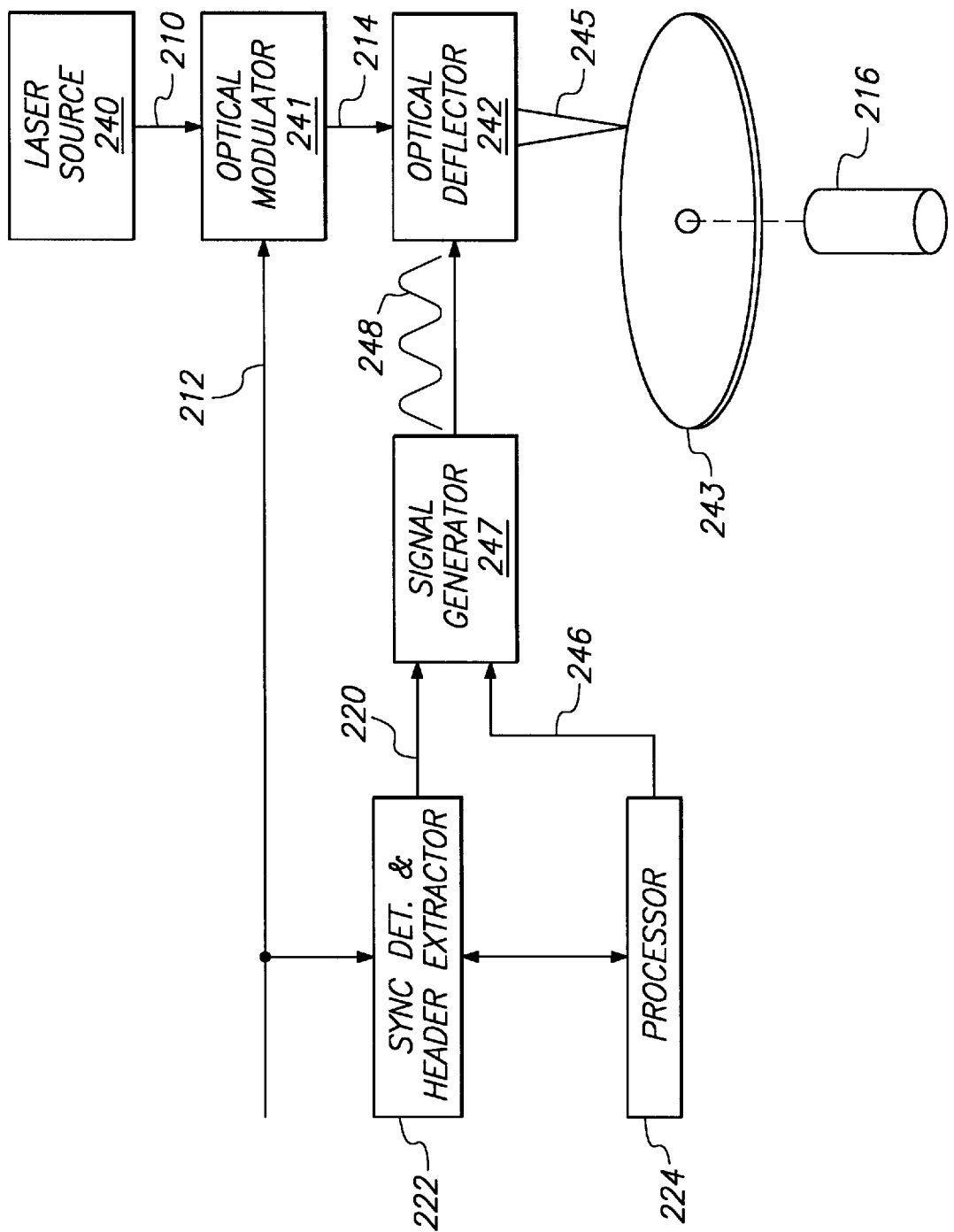

FIG. 4 illustrates a cutting machine which is similar to that of FIG. 3, except the sync detector 222 also extracts the header information from each frame of the EFM signal 212. The header information contains an address of the frame as it will appear on the disk 243. The processor 224 determines from the address in the current header whether a wobble pattern is to be recorded on the disk in the current frame, and if so, asserts a gating signal via a line 246 to the signal generator 247. The signal generator 247 generates the wobble signal only when the gating signal 246 is asserted. In this manner, the cutting machine in FIG. 4 forms the wobble pattern on the disk 243 only within particular desired frames along the spiral centerline of the disk.

C. Reproduction Apparatus

Figure 5:
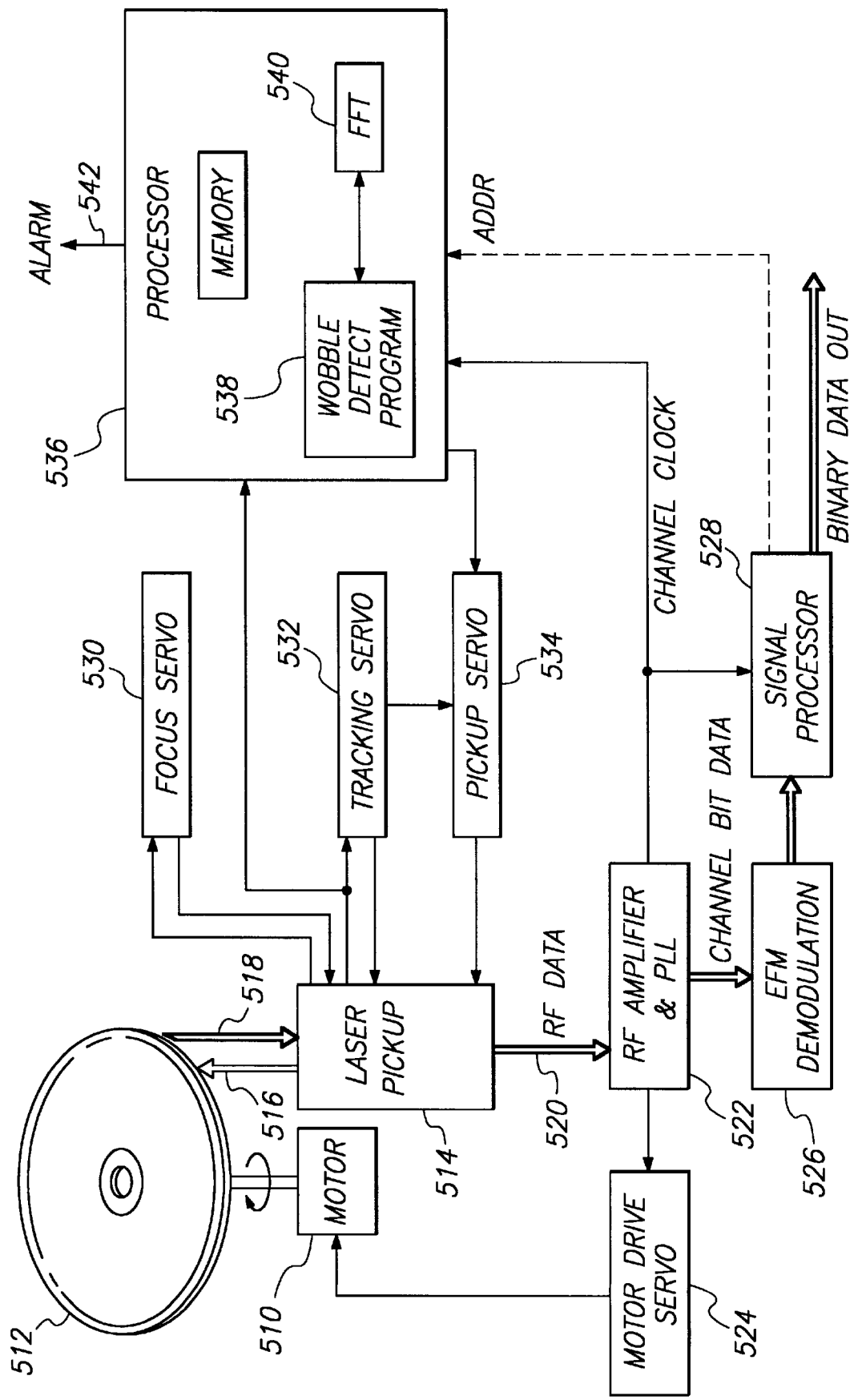
FIGS. 5 and 9 are block diagrams of optical disk readers according to the invention.

FIG. 5 is a block diagram of an optical disk reader according to the invention. It comprises a motor 510 spinning an optical disk 512. A laser pickup 514 illuminates a spot on the disk 512 with a laser beam 516. Actually, for a three beam tracking system, arrow 516 represents three laser beams. The return beam(s) 518 are sensed by one or more optical sensing devices. The main beam generates an RF data signal 520 which is provided to an RF amplifier and phase lock loop (PLL) 522. In a conventional manner, the phase lock loop extracts the channel clock from the RF data and provides it to a motor drive servo 524, which maintains the motor 510 spinning at the desired constant linear velocity. The RF amplifier and phase lock loop 522 provide the channel bit data stream to an EFM demodulator 526 which demodulates the EFM codes. The output signal from EFM demodulator 526 is provided to a signal processor 528 which, in response to the channel clock provided by RF amplifier and phase lock loop 522, converts the EFM signal into the desired binary data output.

The optical sensing devices in the laser pickup 514 also provide a focus feedback signal to a focus servo 530, which controls a vertical actuator on the laser pickup 514 to maintain proper focus of the beam on the optical disks 512. The optical sensors in the laser pickup 514 also produce a tracking error signal in a conventional manner, which is provided to a tracking servo 532. To the extent of frequencies in the tracking error signal which are low enough, the tracking servo 532 controls an actuator in the laser pickup to deflect the beam slightly in the radial direction. If larger radial adjustments are required, a pickup servo 534 moves the entire pickup 514 in the radial direction.

In an aspect of the invention, the tracking error signal from the laser pickup 514 is also provided to a processor 536, which contains a wobble detection program 538 and a partial hardware or software fast Fourier transform (FFT) unit 540. Alternatively, the wobble detection program 538 and/or fast Fourier transform unit 540 can be located on an external host. Only a partial FFT is required because the technique requires determination of the energy content in only two frequency bands.

Figure 6:
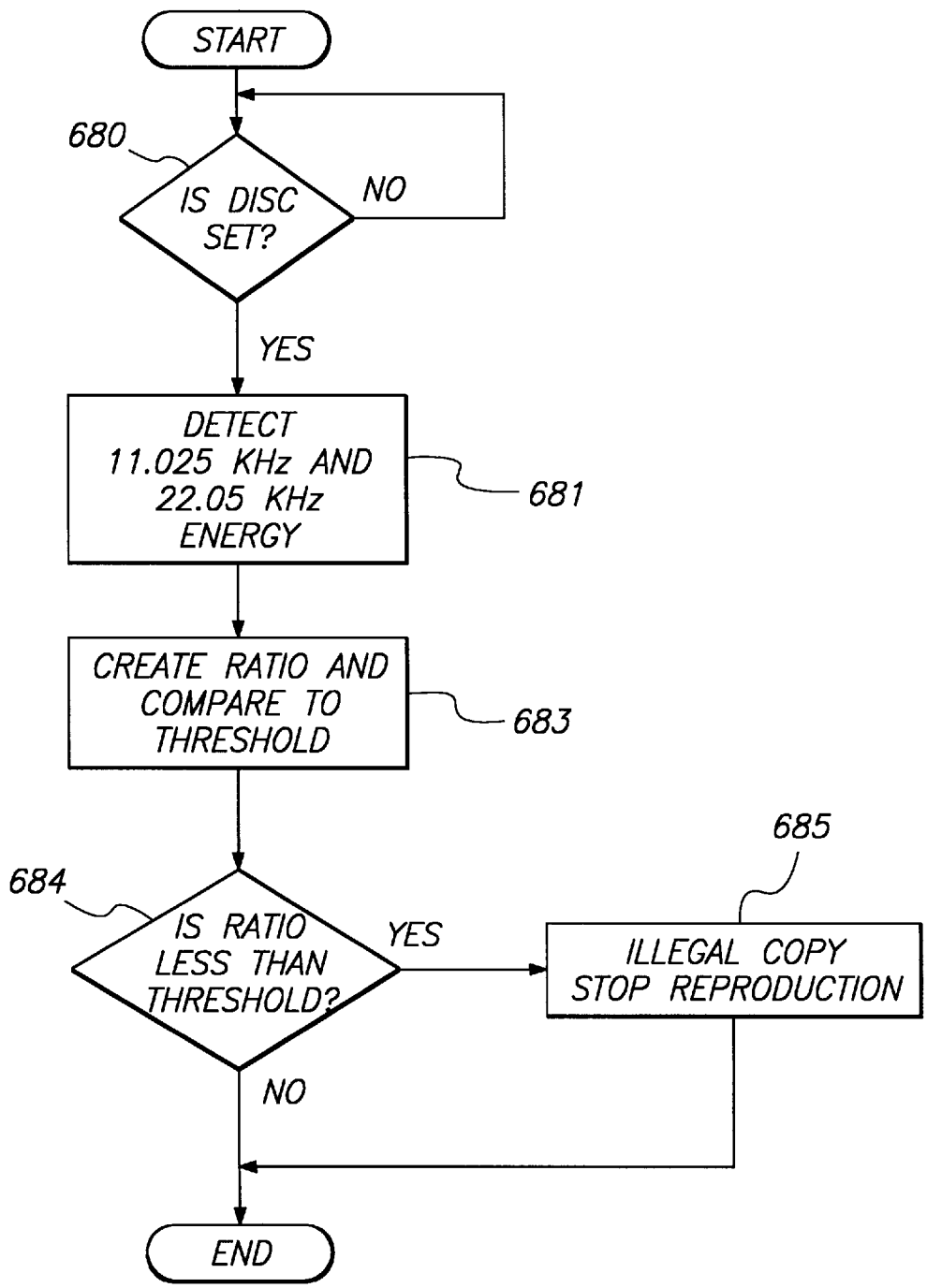
FIGS. 6 and 10–11 are flowcharts describing the operation of optical disk readers according to the invention.

FIG. 6 is a flow chart of the wobble detection program 538 in FIG. 5. In a step 680, the program first waits until the optical disk 512 is set in the optical disk reader. When it is set, in a step 681, the wobble detection program 538 uses the partial FFT 540 to determine the amount of energy in the tracking error signal which is present at frequencies $f_{CC}/196$ and $f_{CC}/392$. For 1×disk drive, this corresponds to determining the amount of energy in the tracking error signal at 22.05 kHz and 11.025 kHz, respectively. The processor 536 may use the channel clock signal from the RF amplifier and phase lock loop 522 to assist in this calculation.

In a step 683, the program calculates the ratio of the energy at $f_{CC}/392$ to the energy at $f_{CC}/196$. In a step 684, it is determined whether the ratio is less than a predefined threshold. If so, then in a step 685, the program asserts an alarm signal 542 (FIG. 5) and takes some action such as ceasing reproduction of the digital signal. The disk 512 is an illegal copy. If the ratio exceeds the threshold, then the disk is considered authentic, and the program ends without stopping reproduction. Alternatively, the program can return to step 681 to test for authenticity repeatedly.

In another embodiment, the signal processor 528 provides addressing information to the processor 536, indicating the address of each frame then being read by the laser pickup 514. The processor 536 executes the wobble detection program 538 only when the addressing information indicates that certain predetermined frames are then being read by the laser pickup 514.

II. EMBODIMENT 2—RECORDING SPEED VARIATIONS

A. Optical Disk Format

When an optical disk is read, the channel clock is derived from the RF data read by the laser pickup, and used to maintain the disk spinning at a rate that produces channel data at a constant channel clock rate. If the channel clock speeds up slightly for any reason, the system automatically compensates by slowing down the spin rate, and vice versa. It can be seen that an optical disk reader can easily accommodate small variations in the channel clock rate without upsetting its operation in any way. An aspect of the invention takes advantage of this feature by recording at a predetermined location on the disks, the number of channel clocks which are present within a predefined arcuate segment (for example, one revolution) of the spiral centerline on the disk. The channel clock variations can be introduced by the cutting machine due to inherent or deliberate motor speed variations, and/or can be deliberately introduced by varying the input EFM data rate.

FIG. 7 is a symbolic plan view of an optical disk 710 according to this aspect of the invention. The disk has lands and pits alternating along a conventional spiral centerline 22, only two parts of which are shown symbolically in FIG. 7. Two segments 712 and 714 of the spiral are shown, each occupying a single revolution of the disk 710. The segments 712 and 714 are shown adjacent to each other in the drawing for simplicity of illustration, but in general, they are not necessarily adjacent. The disk 710 also includes another segment 716 of the spiral 22, which is the length of one data frame. Included in this data frame is a pointer to segment 712 (such as the address of segment 712), together with an indication of the number of channel clocks which are actually included in segment 712. The frame 716 also includes the same information for segment 714.

Although optical disk recording devices, including both cutting machines and CD-WO recorders, attempt to maintain a constant linear velocity upon recording, slight variations in temperature or optical disk spin rate inevitably causes slightly different numbers of channel clocks to be recorded in each particular arcuate segment of the spiral. In fact, once a nominal writing speed of 1.2–1.4 meters per second is chosen, the specifications still allow the spin rate to vary within a tolerance of ±0.01 meters per second.

Accordingly, if a counterfeiter attempts to make illegal or unauthorized copies of the disk 710 of FIG. 7 using a data stream copying technique, inevitably, the number of channel clock periods recorded in segments 712 and 714 of the copy will not exactly match the number which exist in segments 712 and 714 in the original. But since a data stream copy does not change any data, no corresponding adjustment will be made to the data in frame 716 on the copy. Therefore, on the unauthorized copy, frame 716 will contain binary data indicating that segment 712 contains a different number of channel clocks than is actually present in segment 712. Similarly, frame 716 will also contain binary data indicating that segment 714 contains a number of channel clocks different from what is actually contained in segment 714. The optical disk reader can therefore use this information to determine that the disk is an unauthorized copy.

Note that whereas the channel clock speed variations which produced the disk 710 in FIG. 7 were inherent in the recording apparatus, in another embodiment the channel clock speed variations are produced intentionally in the recording device in a manner described below.

On the disk 710, two test segments 712 and 714 are used for copy protection. In another embodiment, only one test segment is used. In yet another embodiment, numerous test segments are used.

Also on the disk 710, pointers to the segments 712 and 714, as well as the number of channel clocks to expect in such segments, are stored as ordinary data in segment 716. In another embodiment, this information is stored in a sub-code channel of the disk. In yet another embodiment, this information is encoded, for example by phase, frequency or amplitude modulation, onto a wobble pattern on the disk such as that shown in FIG. 1. Indeed, one embodiment of the invention includes an optical disk using both copy protection schemes of FIG. 1 and FIG. 7. For example, the lands and pits defining the spiral centerline on the disk of FIG. 7, also define a wobble about such centerline as shown in FIG. 1. Data which points to the segment 712, and further indicates the number of channel clocks to be expected in segment 712, is encoded onto the wobble pattern at some known location on the disk, but the wobble pattern nevertheless has a spatial frequency spectrum with substantially greater energy at $f_{CC}/392$ than at $f_{CC}/196$.

In yet another embodiment, referred to herein as a "relative data amount" embodiment, the disk does not contain a segment 716 indicating the number of channel clocks to be expected in either of the segments 712 or 714. Rather, the difference, ratio, or other comparison function of the number of channel clocks contained in the two segments on an authentic disk is within a predetermined range. The disk may be produced using a cutting machine which intentionally varied the channel clock frequency to ensure that the criteria was met. A counterfeiter who uses a serial data stream copying technique to make unauthorized copies of the disk generally will not know to introduce such substantial variations in the channel clock frequency in the two segments 712 and 714. The optical disk player will therefore be able to detect counterfeiting since the ratio (or difference or other comparison function) of channel clocks in the two segments on the illegal copy will not be within the required range. (Note that in an embodiment, the comparison function of the number of channel clocks contained in the two test segments can be defined to consider the number of channel clocks contained in other test segments as well.)

It will be appreciated that if the two test segments on the disk have the same angular length (e.g., each constitutes one revolution), by nature they will contain different numbers of channel clocks. This is because the segments are recorded along a spiral centerline, which inherently results in different average radii of different segments. The radius-based channel clock count differential is not a problem for the "relative data amount" technique, however, because the difference between the two channel clock counts due to the radial difference is very small compared to the difference that can be introduced intentionally, especially if the two test segments are near each other radially. For example, a track near the outer third of a disk contains nominally more than 1,000,000 channel clocks per revolution. In this region of the disk, a nearly imperceptible variation of 0.1% in the channel clock frequency will produce a variation of over 1000 channel clocks per revolution. A 0.1% variation in channel clock frequency is well within the specifications, and the playback apparatus is easily able to accommodate it. On the other hand, if the two test segments are chosen to be about one second apart (3–7 tracks), then a difference of less than 200 channel clocks per revolution would be expected due solely to the radial difference. Therefore, playback equipment designed to test for a channel clock count difference in the range of, say, 500–1500 channel clocks, would easily be able to distinguish between authentic disks (on which the channel clock is intentionally varied by 0.1% between the two test segments) and unauthentic disks (on which the difference between the two channel clock counts arises exclusively (or almost exclusively) due to the radial difference).

In one embodiment, the radius-based channel clock count difference is used to advantage. In particular, the two test segments are disposed at substantially different average radii on the disk, but the spatial channel clock frequency is adjusted so that both segments contain the same number of channel clock cycles (or the difference between the numbers of channel clock cycles is within a predefined range). In yet another embodiment (sometimes referred to herein as a track-to-track alignment embodiment), the channel clock frequencies in the two test segments are controlled such that a particular kind of mark, such as a sync mark, occurs at (or approximately at) a predefined angular distance apart. The predefined angular distance translates to a predefined temporal distance (i.e., time difference) when the disk is being spun at a predetermined rate on playback. Thus the playback equipment will be able to determine authenticity by looking for the mark in the second test segment at a predetermined time (or time range) after it is detected in the first test segment. Playback apparatus for use in the track-to-track alignment embodiment is discussed further below.

B. Recording Apparatus

Figure 8:
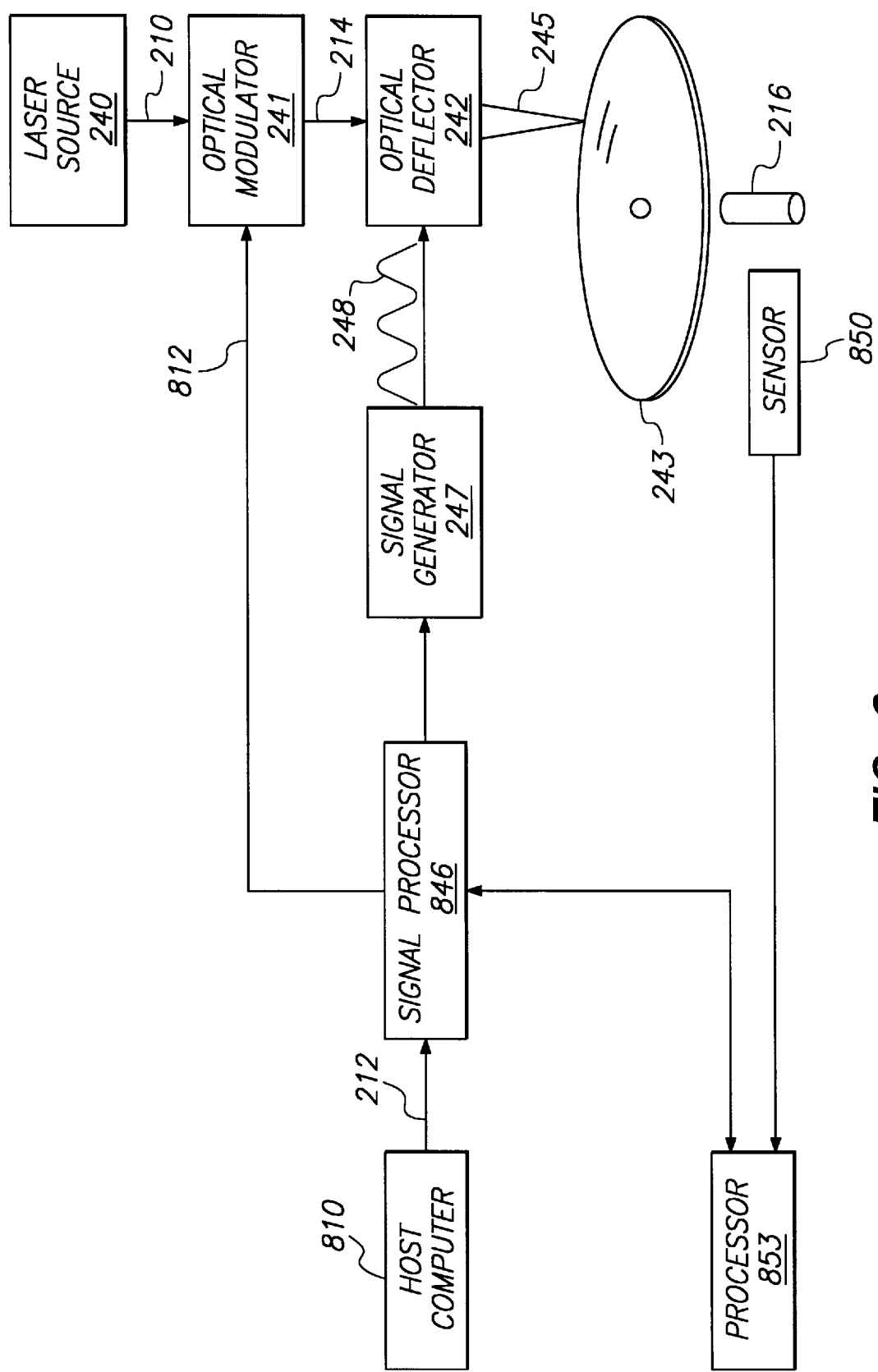

FIG. 8 is a block diagram of a cutting machine which incorporates the speed variation aspect of the present invention. Referring to FIG. 8, the write head, including laser source 240, optical modulator 241 and optical deflector 242, are the same as the corresponding components of FIG. 2. Similarly, the disk 243 is spun at a constant linear velocity by motor 216, as in FIG. 2. In addition, the apparatus in FIG. 8 also includes a sensor 850 which is positioned adjacent to the spindle of motor 216, and which senses whenever the spindle makes a complete revolution. The sensor 850 provides a signal to a processor 853 indicating each revolution of the spindle (and therefore of the disk 243).

The EFM input signal 212, instead of being provided directly to the optical modulator 241, instead is provided to a signal processor 846, the output 812 of which is provided to the optical modulator 241. The signal processor 846 is also connected to the processor 853.

In operation, the signal processor 846 initially simply passes the EFM signal arriving on line 212 directly to the optical modulator 241 via the line 812. The photoresist on the disk 243 is exposed in a spiral manner, beginning at an inner radius and proceeding to an outer radius. The sensor 850 indicates to the processor 853 each time the disk 243 completes one revolution in the writing process. At the same time, signal processor 846 provides a channel clock signal to the processor 853. With these two signals, the processor 853 is able to count the number of channel clocks actually recorded on the disk within each revolution (as delimited by the sensor 850). When the processor 853 determines that the write head is now writing to segment 712 (FIG. 7) of the disk 243, it makes a note of the number of channel clocks recorded in that segment. Similarly, when the processor 853 determines that the write head is now writing to segment 714, it makes a note of the number of channel clocks recorded in that segment. Note that the channel clock counts made by processor 853 are in revolutions delimited by sensor 850, which may not coincide exactly with the test segments 712 and 714. However, the number of channel clocks counted in a sensor-delimited revolution that overlaps with a test segment will be close enough for an approximation of the number of channel clocks actually recorded in the test segment. Alternatively, the processor 853 can improve the approximation by interpolation or extrapolation from the number of channel clocks counted in sensor-delimited revolutions.

At some later time during the cutting process, the processor 853 causes the signal processor 846 to substitute, for some appropriate part of the EFM signal arriving on line 212, an EFM signal which represents binary data pointing to the segments 712 and 714 and indicating the number of channel clock cycles (or an approximation thereof) that were actually recorded within such segments. Alternatively, instead of recording the number of channel clock cycles in each test segment, the processor 853 can cause the signal processor 846 to record a relationship between the channel clock cycles determined for the two test segments. The signal processor 846 then resumes transferring EFM data from input signal line 212 onto its output signal line 812. In this way, the appropriate information has now been recorded in segment 716 (FIG. 7) of the disk 243.

In one embodiment, the signal processor substitutes the desired information into an ordinary (otherwise unused) part of the data being recorded onto the disk. In another embodiment, the signal processor 846 substitutes the data into an otherwise unused subcode channel of the signal, replacing the sub-code bits that were included by default in the EFM signal 212.

In yet another embodiment, the optical deflector 242 responds to a signal 248 being produced by a signal generator 247 as in FIG. 2. The signal processor 846, instead of inserting data into the EFM data stream, instead provides a data signal to the signal generator 247 which encodes it, for example by frequency, phase or amplitude modulation, onto the signal 248. Thus, a wobble pattern is created on the disk 243, having indications encoded thereon which point to the tracks 712 and 714 and which specify the number of channel clocks to expect in each of such segments.

In one embodiment, the EFM signal 212 is provided by a host computer 810 with an intentionally constant channel clock frequency and the signal processor 846 maintains that frequency. All the variations in channel clock frequency as actually recorded on the disk 243 result from inherent spin rate variations. In another embodiment, the signal processor 846 intentionally varies the channel clock frequency with which it provides the EFM signal 812. Such an embodiment would cause variations in the spatial channel clock frequency on segments 712 and 714, even if the spin motor 216 managed to maintain an exactly constant linear recording velocity.

Figure 12:
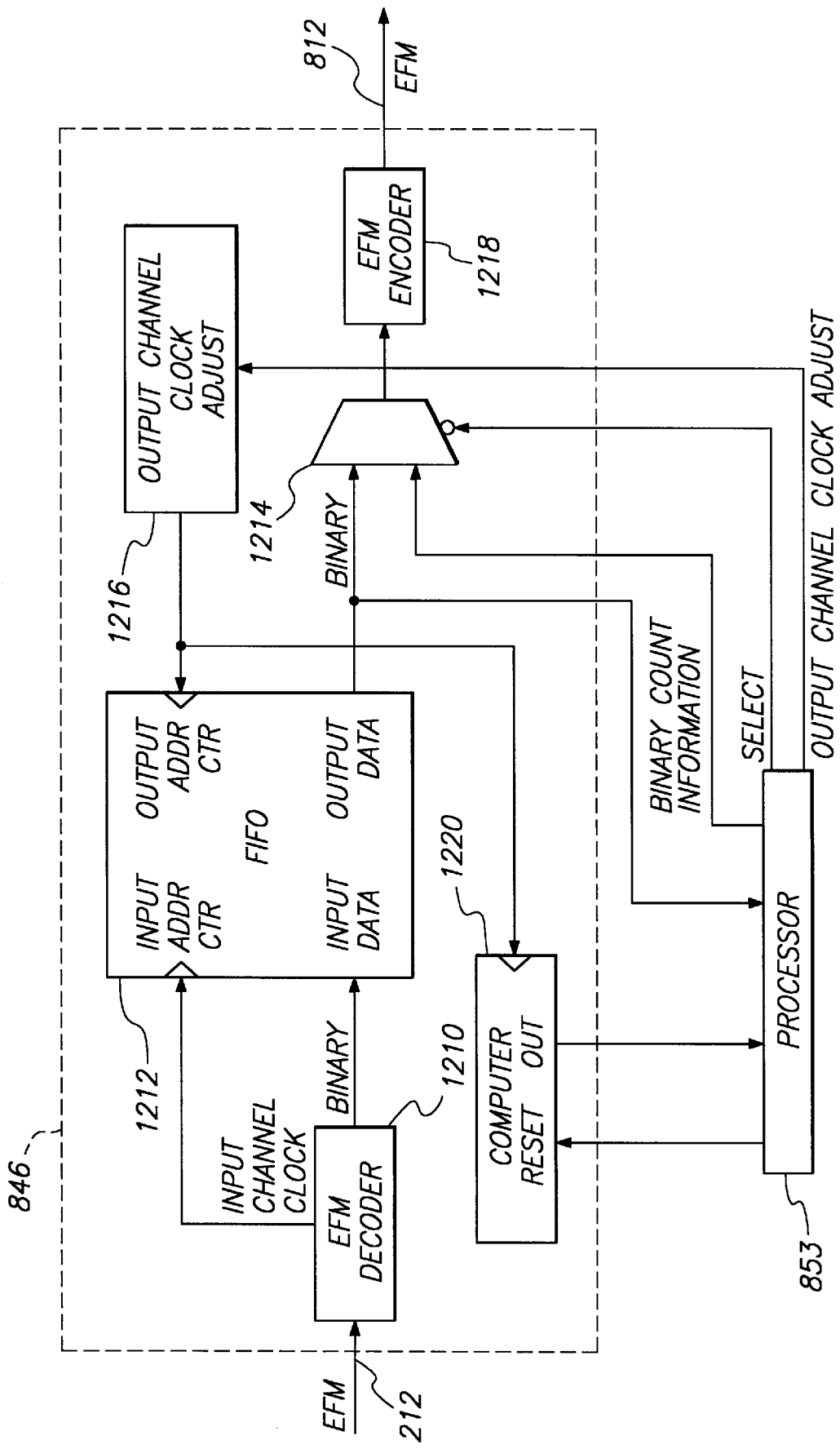
FIG. 12 is a block diagram of the signal processor shown in FIG. 8.

FIG. 12 is a symbolic block diagram of pertinent parts of an embodiment of the signal processor 846, for use in an embodiment having an intentionally varied channel clock frequency, in which the data indicating the number of channel clocks which were actually recorded in the test segment(s) is written as ordinary data or subcode data to segment 716. The input EFM data stream 212 is provided to an EFM decoder 1210, which converts it to binary data and provides it to the data input port of a first-in-first-out memory (FIFO) 1212. The decoder 1210 also recovers the channel clock from the input EFM data 212 and uses it to clock the input address counter of the FIFO 1212. The output data port of FIFO 1212 is connected to one input port of a multiplexer 1214, the other input port of which, at an appropriate time, receives the channel clock count information from processor 853. The processor 853 also has a selection output which is connected to the select input of multiplexer 1214. The binary data output of FIFO 1212 is also provided to the processor 853. The output address counter of FIFO 1212 is clocked by an output channel clock 1216, the frequency of which is controlled by an adjust signal from processor 853. The output channel clock signal also clocks a counter 1220, which receives a reset input signal from processor 853 and provides a count output signal to processor 853. The output of multiplexer 1214, which is still in binary form, is provided to an EFM encoder 1218 to form the EFM output signal 812. Note that in an embodiment in which the channel clock frequency is not intentionally varied across the disk, the FIFO 1212 and the output channel clock 1216 can be omitted.

In operation, the input EFM signal provided by host computer 810 at a fixed channel clock rate is converted to binary by decoder 1210 and clocked into the FIFO 1212. In normal operation, the output channel clock 1216 operates at the same frequency as the input channel clock, so data is read out of FIFO 1212 at the same rate as it is written, thereby maintaining a constant difference between read address and write address. The binary data read from FIFO 1212 passes through multiplexer 1214 and through the encoder 1218 to form the EFM signal 812 at the same channel clock rate as the input EFM signal 212.

When the processor 853 detects from the binary data output of FIFO 1212 that data is about to be written to test segment 712, the processor 853 waits for the next timing signal from sensor 850. At that time it allows counter 1220 to begin counting channel clocks, and also it controls the output channel clock to slow down (or speed up) the output channel clock frequency by the desired amount. The FIFO 1212 is deep enough to accommodate the different data rates for writing data to and reading data from the FIFO 1212, for at least the period of segment 712.

When processor 853 receives the next timing signal from sensor 850, indicating the end of test segment 712, it reads and stores the channel clock count from counter 1220, resets counter 1220, and causes output channel clock 1216 to return to the same frequency as the input channel clock derived from the input EFM signal 212. (In another embodiment, instead of resetting the counter 1220 before counting and then reading and storing the channel clock count from the counter after counting, the processor 853 can simply note the start and stop counts and store the difference between them.) If there is more than one test segment, the apparatus of FIG. 12 repeats this process, perhaps with an opposite adjustment in the output channel clock frequency in order to return the FIFO output address counter to a normal desired difference from the input address counter.

Later, when the processor 853 determines from the binary data being written to the disk that data is now being written to segment 716, processor 853 begins providing the channel clock count information previously read from counter 1220, to the multiplexer 1214. It controls multiplexer 1214 to select such count information at appropriate bit positions in order to substitute the count information for whatever data was in such bit positions previously. In this manner the apparatus of FIGS. 8 and 12 intentionally varies the channel clock frequency as recorded on the disk in the test segment (s), and writes into segment 716 an indication of the number of channel clocks actually recorded in such test segment(s).

For the "relative data amount" aspect of the present invention, the same apparatus as shown in FIGS. 8 and 12 may be used, except that the multiplexer 1214 (FIG. 12) may be omitted because processor 853 does not need to substitute any data for data previously existing in the input EFM signal 212. Instead, the processor 853 merely controls the output channel clock frequency within the two test segments to ensure that the two segments contain the correct relative number of channel clocks.

In an embodiment in which the average radii of the two test segments are substantially different but the number of channel clock cycles to be written in each test segment is to be the same (or approximately the same), the processor controls the output channel clock frequencies such that $f_{CC2}$ is approximately equal to $(r_1/r_2)f_{CC1}$, where $f_{CC}$ is the output channel clock frequency used within test segment 712, $f_{CC2}$ is the output channel clock frequency used within test segment 714, $r_1$ is the average radius of test segment 712 and $r_2$ is the average radius of test segment 714. Similar calculations can be made in the track-to-track alignment embodiment, to ensure that the timing marks are written at the desired angular distance apart on the two test segments.

C. Reading Apparatus

Figure 9:
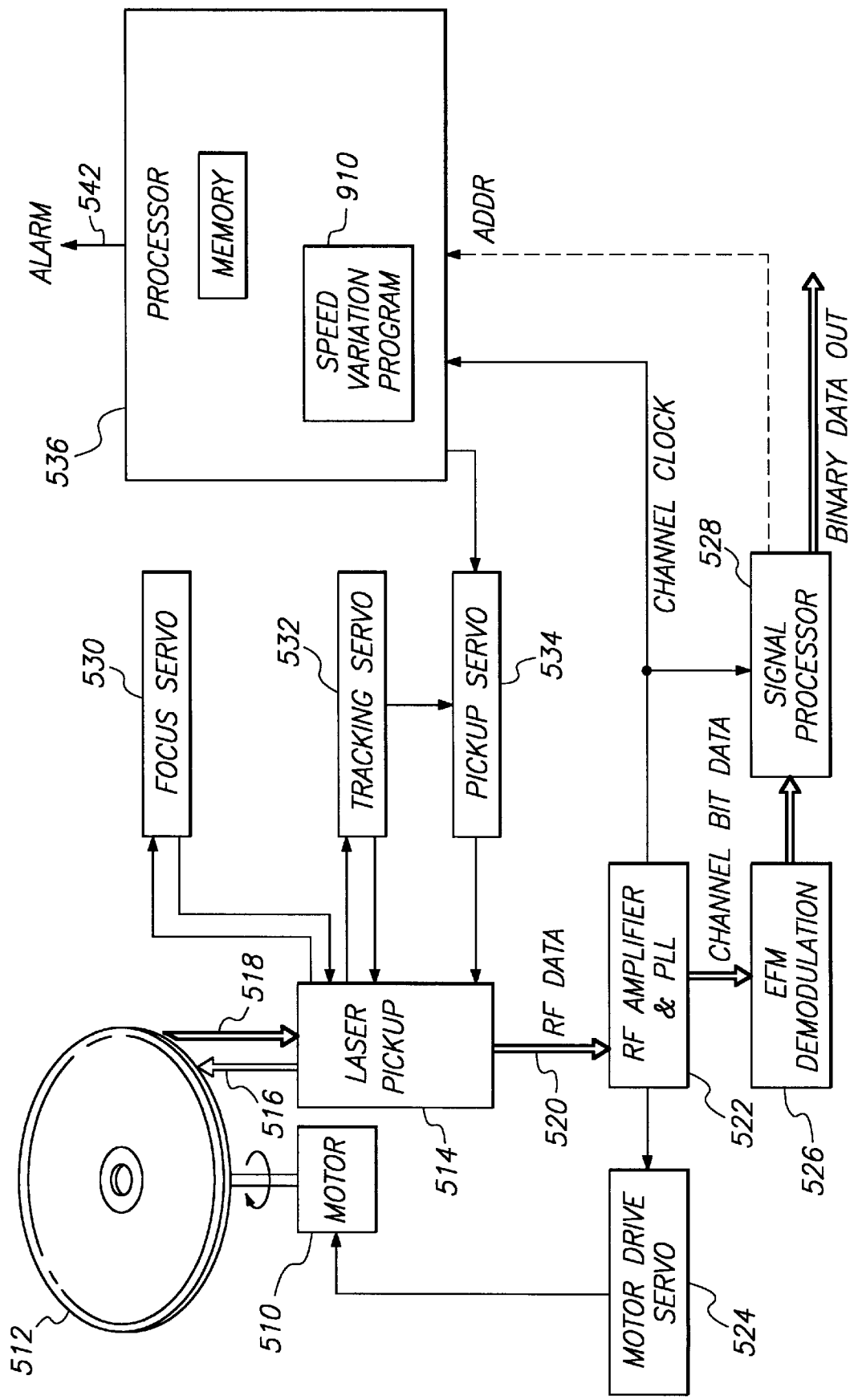

FIG. 9 is a block diagram of an optical disk reproduction device which detects unauthorized optical disks using the speed variation aspect of the present invention. It is the same as the apparatus of FIG. 5, except that the processor 536 includes a speed variation program 910 instead of the wobble detect program 538.

Figure 10:
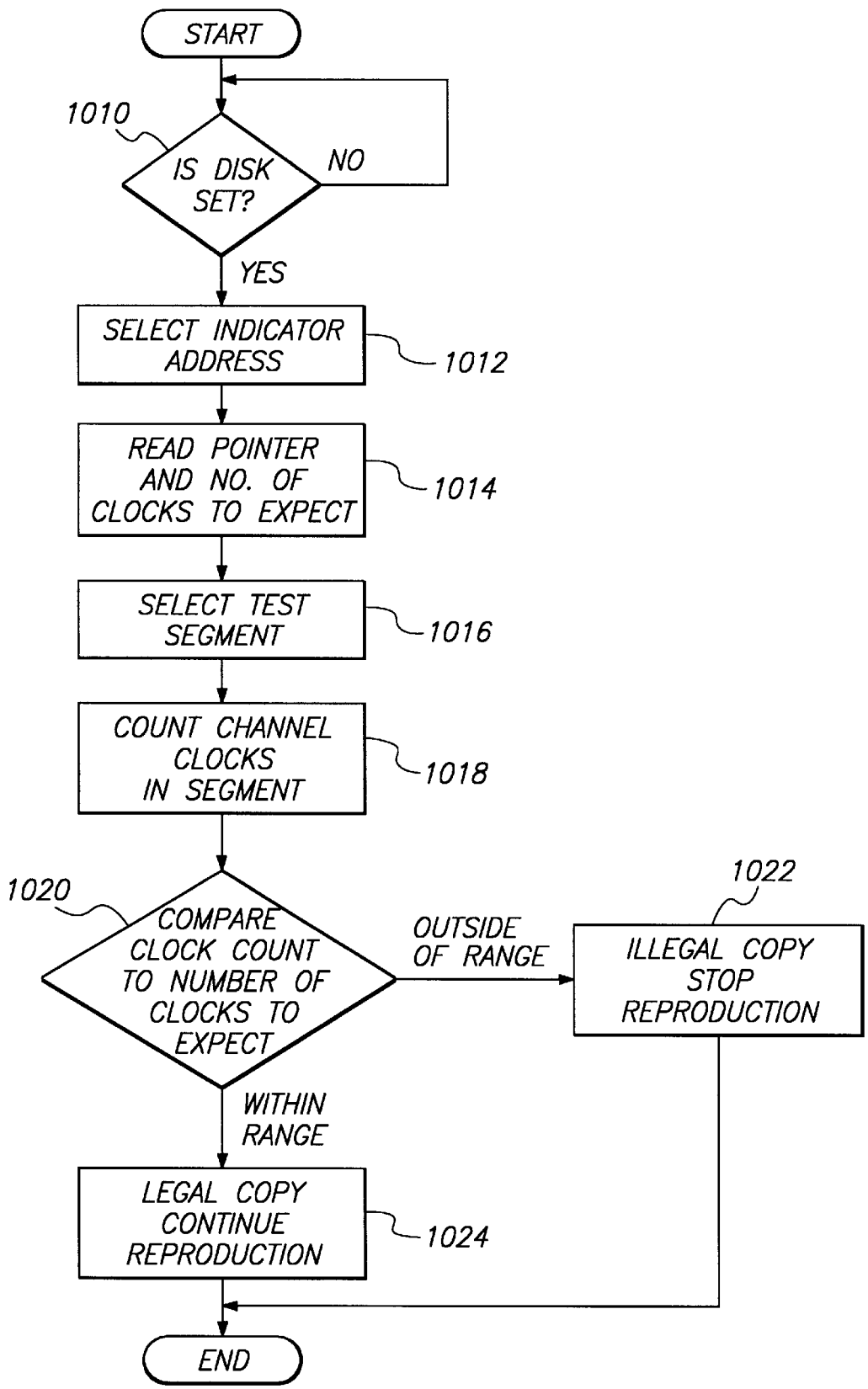

FIG. 10 is a flowchart describing the operation of the speed variation program 910. Beginning in a step 1010, the program waits until the disk 512 is set in the optical disk reader of FIG. 9. In a step 1012, the processor 536 signals the pickup servo 534 to move the laser pickup to a predetermined address on the optical disk, for example to the address of frame 716 (FIG. 7). In step 1014, the program reads the pointer to the test segment of the disk (for example, segment 712), and the number of channel clocks to expect within the segment. If more than one segment on the disk is to be tested, the pointers and the number of clocks to expect in each test segment can be read at this time as well.

In a step 1016, the program 910 causes the pickup servo 534 to move the laser pickup 514 to the proper radius to read the segment 712 identified in the frame 716. The program then obtains the number of channel clock cycles which occur within the segment 712, for example by using a hardware counter (not shown) similar to counter 1220 in FIG. 12 (step 1018). In a step 1020, the program compares the number of clocks detected in step 1018 to the number of clocks expected, as read from the frame 716. If the two numbers are not within a predetermined range of each other, then the apparatus determines the disk 512 to be an unauthorized copy, and issues the alarm signal 542 (step 1022). For example, the apparatus might stop the reproduction. If the two numbers are within the predetermined range of each other, then the program has determined the disk 512 to be an authorized copy (step 1024), and reproduction continues.

Note that if the pointer to the test track and the number of clocks to expect are encoded in a different manner on the optical disk 512, then steps 1012 and 1014 are adjusted accordingly. For example, if the information is encoded on a sub-code channel, then these steps select the appropriate frame or frames and collect the sub-code bits which contain the desired information. Similarly, if the information is encoded on a wobble pattern, then steps 1012 and 1014 select the appropriate part of the disk at which the wobble pattern contains the desired information, and retrieves the information from a decoding of the tracking error signal. In this case, the processor 536 would receive the tracking error signal from the laser pickup 514 as in the apparatus of FIG. 5, and the program would extract the desired information via software.

Figure 11:
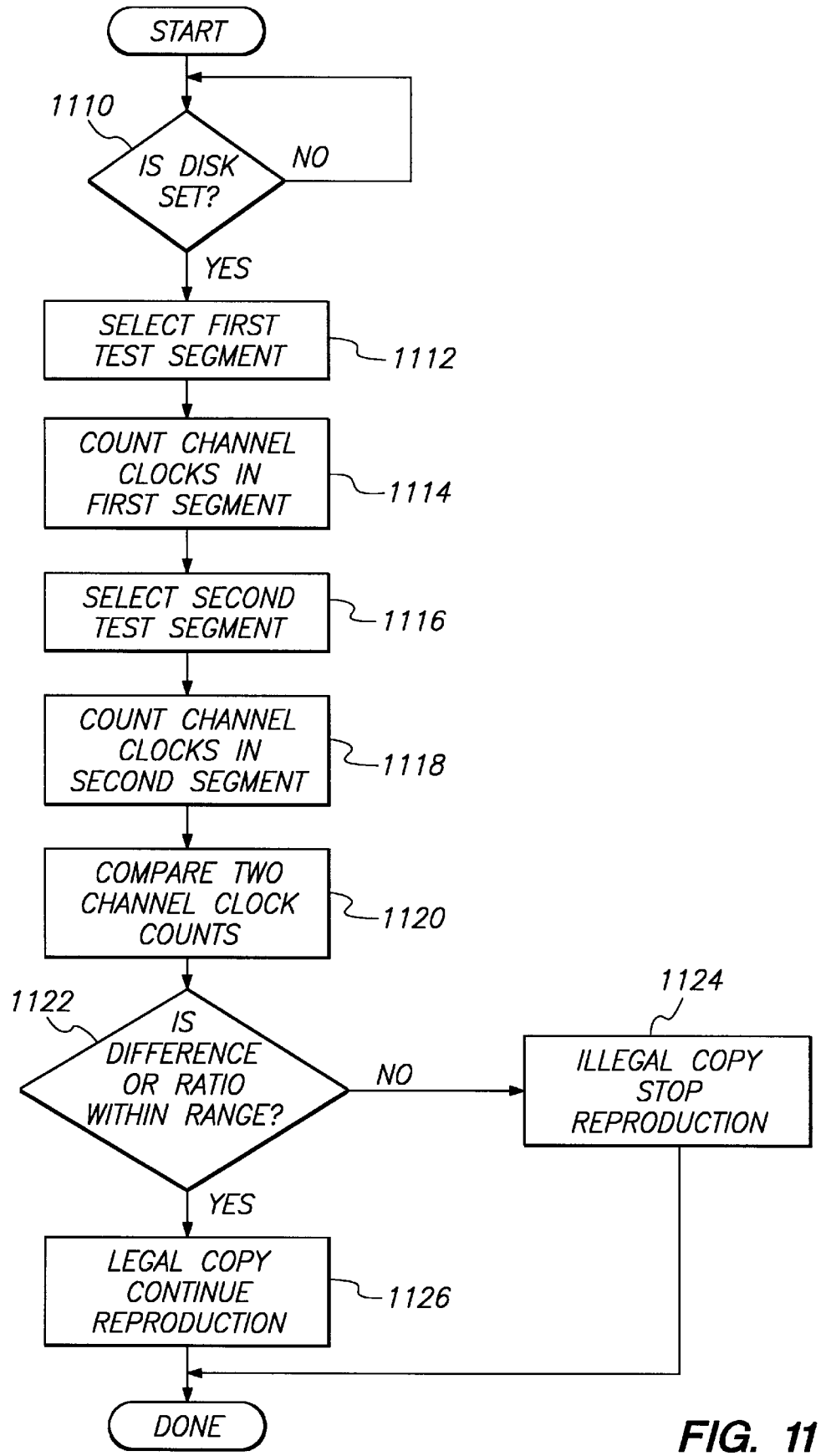

FIG. 11 is a flowchart of the speed variation program 910 for the "relative data amount" embodiment of the speed variation aspect of the invention. In a step 1110, the program waits until the disk 512 is set in the reading apparatus. In a step 1112, the program causes the pickup servo 534 to move the laser pickup 514 to the radius of a first predetermined test segment, such as segment 712 (FIG. 7). In a step 1114, the program obtains the number of channel clocks which occur in the segment 712. In a step 1116, if the second test segment is not immediately subsequent to the first along the spiral centerline of the disk, then the program causes the pickup servo 534 to move the laser pickup 514 to the radius of the second predetermined test segment, such as segment 714 (FIG. 7). In step 1118, the program obtains the number of channel clocks which occur in the second test segment 714. In a step 1120, the program compares the two channel clock counts from the two test segments, and determines (step 1122) whether their difference or ratio is within the predetermined range. If not, then the disk is determined to be an illegal copy and the processor 536 asserts the alarm signal 542 (step 1124). If the difference is within the predetermined range, then in step 1126, the program determines the disk 512 to be a legal copy, and reproduction continues.

The flowcharts of FIGS. 10 and 11 each include one or more steps of counting the number of channel clocks within a test segment. In one embodiment, the apparatus of FIG. 9 includes a revolution sensor similar to sensor 850 in the recording apparatus (FIG. 8), and the processor 536 knows to start and stop the count by reference to the timing signals provided by such a sensor. In another embodiment, the expense of revolution sensor is avoided by using the following method to obtain an approximation of the number of channel clocks within the test segment.

First, the processor 536 controls the pickup servo 534 to move the laser pickup 514 to a radius slightly short of the radius of the test segment (e.g., segment 712). The disk speed stabilizes somewhat, and the PLL 522 recovering the channel clock stabilizes as well. When the pickup reaches the address of the desired test segment, channel clock counting begins. Then, based on some event closely tied to an exact location on disk, such as the next subcode sync mark, the processor 536 controls the pickup servo 534 to cause the pickup 514 to jump back exactly one track. The frequency of the channel clock after the jump may not be exactly the same as it was prior to the jump, but it will be close enough for an approximation. Also, the PLL 522 is designed in a conventional manner to quickly recover phase lock after the jump. Counting then continues until the disk rotates back to the originally detected address of the desired test segment, at which point counting terminates.

The count determined by this method now represents one complete revolution of the disk (the length, in the present embodiment, of the test segment 712). The segment whose channel clocks are counted by this method may not be exactly the same as the segment whose clocks were counted upon recording, but the approximation should nevertheless be close enough to enable easy determination of the authenticity of the disk.

In addition, the above method for obtaining a channel clock count can be shortened by noting that much of the counting takes place in frames which are already known to contain exactly 588 channel clocks. Thus counting can actually stop after the backwards jump, at the next detected frame address. The remainder of the counting can be replaced by a calculation of 588 times the number of complete frames between the newly detected address and the address at which counting began. Other variations and simplifications will also be apparent.

In addition to the above, other techniques also exist for determining whether the channel clock count(s) in one or more test segment(s) is (are) appropriate. For example, in the track-to-track alignment embodiment, the following method may be used to determine authenticity. First, the pickup head is positioned at the first test segment. When the particular kind of mark is detected, the pickup head is then repositioned at the second test segment. If the particular kind of mark does not appear within a predefined range of time after it appeared in the first test segment, then the disk is determined to be unauthentic and the alarm is issued. It will be appreciated that for this embodiment, the predefined angular distance should be sufficient to allow time for the pickup to seek from the first test segment to the second.

It should be understood that in both FIGS. 5 and 9, the processor 536 (or parts of it) can be located externally. In addition, it should be noted that an embodiment of the invention can include both forms of copy protection (wobble detection and speed variation) by including appropriate programs in the processor 536.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. An optical disk having data bit indications along a spiral centerline of said disk, said bit indications defining a channel clock having a frequency of $f_{CC}$ clock cycles per unit of arcuate length along said centerline, said data bit indications further defining a radial wobble about said centerline, along at least a predefined segment of said centerline, said wobble having substantially greater energy at a predefined frequency $f_{CPW}$ than at a frequency of $f_{CC}/196$.

2. A disk according to claim 1, wherein said predefined frequency $f_{CPW}$ is approximately equal to $f_{CC}/392$.

3. A disk according to claim 1, wherein said predefined frequency $f_{CPW}$ is an integer subharmonic of $f_{CC}/196$.

4. A disk according to claim 1, wherein said bit indications define said radial wobble along all of said spiral centerline.

5. A disk according to claim 1, wherein said wobble has data encoded thereon.

6. A disk according to claim 5, wherein said data is frequency modulated onto said wobble.

7. An optical disk having data bit indications along a spiral centerline of said disk, said bit indications defining a channel clock having a frequency of $f_{CC}$ clock cycles per unit of arcuate length along said centerline, said data bit indications further defining a radial wobble about said centerline, along at least a predefined segment of said centerline, said wobble having substantially greater energy at a frequency $f_{CPW}$ than at a predefined reference frequency $f_{REF}$, where $f_{CPW}$ is approximately equal to an integer sub-harmonic of $f_{CC}/196$.

8. A disk according to claim 7, wherein $f_{CPW}$ is equal to said integer sub-harmonic of $f_{CC}/196$.

9. A disk according to claim 7, wherein $f_{CPW}$ is approximately equal to $f_{CC}/392$.

10. A disk according to claim 7, wherein $f_{CPW}$ is approximately equal to $f_{CC}/392$ and $f_{REF}=f_{CC}/196$.

11. A method for making an optical disk in response to a data bit stream, comprising the steps of:

writing bit indications in response to said data bit stream onto said disk along a substantially spiral centerline of said disk, in accordance with a channel clock having a frequency of $f_{CC}$ clocks per unit of arcuate length along said centerline;

wobbling said bit indications radially about said centerline, along at least a predefined segment of said centerline, in accordance with a predefined wobble pattern, said wobble pattern having substantially greater energy at a predefined frequency $f_{CPW}$ than at a frequency of $f_{CC}/196$.

12. A method according to claim 11, wherein said predefined frequency $f_{CPW}$ is approximately equal to $f_{CC}/392$.

13. A method according to claim 11, wherein said predefined frequency $f_{CPW}$ is an integer subharmonic of $f_{CC}/196$.

14. A method according to claim 11, wherein said step of wobbling said bit indications comprises a step of wobbling said bit indications along all of said spiral centerline.

15. A method according to claim 11, for use further with wobble data, wherein said predefined wobble pattern has said wobble data encoded thereon.

16. A method according to claim 15, wherein said wobble data is frequency modulated onto said wobble pattern.

17. A method according to claim 11, further comprising a step of mastering additional disks from said optical disk.

18. A method according to claim 11, further comprising the step of reproducing said data bit stream from said bit indications on said disk.

19. A method for making an optical disk in response to a data bit stream, comprising the steps of:

writing bit indications in response to said data bit stream onto said disk along a substantially spiral centerline of said disk, in accordance with a channel clock having a frequency of $f_{CC}$ clocks per unit of arcuate length along said centerline;

wobbling said bit indications radially about said centerline, along at least a predefined segment of said centerline, in accordance with a predefined wobble pattern, said wobble pattern having substantially greater energy at a frequency $f_{CPW}$ than at a predefined reference frequency $f_{REF}$, where $f_{CPW}$ is approximately equal to an integer sub-harmonic of $f_{CC}/196$.

20. A method according to claim 19, wherein $f_{CPW}$ is equal to said integer sub-harmonic of $f_{CC}/196$.

21. A method according to claim 19, wherein $f_{CPW}$ is approximately equal to $f_{CC}/392$ and $f_{REF}=f_{CC}/196$.

22. Optical disk recording apparatus, for use with a data stream signal defining a channel clock having a frequency of $f_{CC}$ clocks per unit time, comprising:

a spinner for spinning a disk;

a write head disposed relative to said disk and directing a writing beam toward a surface of said disk, said writing beam being moveable radially relative to said disk so as to traverse a substantially spiral centerline of said spinning disk, said write head modulating said beam in response to said data stream signal, said write head further having a deflection signal input and deflecting said beam radially with respect to said disk in response to a signal received on said deflection signal input; and a wobble control circuit having an output connected to said deflection signal input, said wobble control circuit producing an output signal on its output which has substantially greater energy at a predefined frequency $f_{CPW}$ than at a frequency of $f_{CC}/196$, at least.

23. Apparatus according to claim 22, wherein said predefined frequency $f_{CPW}$ is approximately equal to $f_{CC}/392$.

24. Apparatus according to claim 22, wherein said predefined frequency $f_{CPW}$ is an integer subharmonic of $f_{CC}/196$.

25. Apparatus according to claim 22, wherein said wobble control circuit produces said output signal while said writing beam traverses all of said centerline.

26. Apparatus according to claim 22, for use further with wobble data, wherein said wobble control circuit encodes said wobble data onto said output signal.

27. Optical disk recording apparatus, for use with a data stream signal defining a channel clock having a frequency of $f_{CC}$ clocks per unit time, comprising:

a spinner for spinning a disk;

a write head disposed relative to said disk and directing a writing beam toward a surface of said disk, said writing beam being moveable radially relative to said disk so as to traverse a substantially spiral centerline of said spinning disk, said write head modulating said beam in response to said data stream signal, said write head further having a deflection signal input and deflecting said beam radially with respect to said disk in response to a signal received on said deflection signal input; and a wobble control circuit having an output connected to said deflection signal input, said wobble control circuit producing an output signal on its output which has substantially greater energy at a frequency $f_{CPW}$ than at a predefined reference frequency $f_{REF}$, where $f_{CPW}$ is approximately equal to an integer sub-harmonic of $f_{CC}/196$.

28. Apparatus according to claim 27, wherein $f_{CPW}$ is equal to said integer sub-harmonic of $f_{CC}/196$.

29. Apparatus according to claim 27, wherein $f_{CPW}$ is approximately equal to $f_{CC}/392$ and $f_{REF}=f_{CC}/196$.

30. A disk according to claim 1, wherein said data bit indications further define a radial wobble about said centerline along at least a second predetermined segment of said centerline, and wherein said indication of the number of said channel clock cycles which occur along a first predetermined segment of said centerline is stored as data that is encoded onto said wobble.

31. A disk according to claim 30, wherein said data is frequency modulated onto said wobble.

32. A disk according to claim 30, wherein said wobble pattern has a carrier frequency that is approximately equal to an integer sub-harmonic of $f_{CC}/196$.

33. A disk according to claim 32, wherein said carrier frequency is $f_{CC}/392$.

34. A disk according to claim 1, wherein said data bit indications further define a radial wobble about said centerline along at least a second predetermined segment of said centerline, said wobble having substantially greater energy at a predefined frequency $f_{CPW}$ than at a frequency of $f_{CC}/196$.

35. A disk according to claim 1, wherein said data bit indications further define a radial wobble about said centerline along at least a second predetermined segment of said centerline, said wobble having substantially greater energy at a frequency $f_{CPW}$ than at a predefined reference frequency $f_{REF}$, wherein $f_{CPW}$ is approximately equal to an integer sub-harmonic of $f_{CC}/196$.

36. Optical disk recording apparatus, comprising:

a spinner for spinning a disk;

a write head disposed relative to said disk and directing a writing beam toward a surface of said disk, said writing beam being moveable radially relative to said disk so as to traverse a substantially spiral centerline of said spinning disk, said write head modulating said beam in response to a beam modulation signal; and a modulation signal provider which provides said beam modulation signal in accordance with a first channel clock frequency $f_{CC1}$ when said beam is traversing a first predetermined segment of said centerline, and which provides said data stream signal in accordance with a second channel clock frequency $f_{CC2}$ when said beam is traversing a second predetermined segment of said centerline, said spinner spinning said disk at a first linear velocity when said beam is traversing said first predetermined segment of said centerline and spinning said disk at a second linear velocity substantially equal to said first linear velocity when said beam is traversing said second predetermined segment of said centerline, wherein $f_{CC1}$ bears a predetermined non-equal relationship to $f_{CC2}$ and said write head further has a deflection signal input and deflects said writing beam radially with respect to said disk in response to a signal received on said deflection signal input, further comprising:

a wobble control circuit having an output connected to said deflection signal input, said wobble control circuit producing an output signal on its output which has substantially greater energy at a frequency $f_{CPW}$ than at a predefined reference frequency $f_{REF}$, where $f_{CPW}$ is approximately equal to an integer sub-harmonic of $f_{CC}/196$.

37. Optical disk recording apparatus, comprising:

a spinner for spinning a disk;

a write head disposed relative to said disk and directing a writing beam toward a surface of said disk, said writing beam being moveable radially relative to said disk so as to traverse a substantially spiral centerline of said spinning disk, said write head modulating said beam in response to a beam modulation signal; and a modulation signal provider which provides said beam modulation signal in accordance with a first channel clock frequency $f_{CC1}$ when said beam is traversing a first predetermined segment of said centerline, and which provides said data stream signal in accordance with a second channel clock frequency $F_{CC2}$ when said beam is traversing a second predetermined segment of said centerline, said spinner spinning said disk at a first linear velocity when said beam is traversing said first predetermined segment of said centerline and spinning said disk at a second linear velocity substantially equal to said first linear velocity when said beam is traversing said second predetermined segment of said centerline, wherein $f_{CC1}$ bears a predetermined non-equal relationship to $f_{CC2}$ and said write head further has a deflection signal input and deflects said writing beam radially with respect to said disk in response to a signal received on said deflection signal input, further comprising:

a wobble control circuit having an output connected to said deflection signal input, said wobble control circuit producing an output signal on its output which has substantially greater energy at a frequency $f_{CPW}$ than at a predefined reference frequency $f_{REF}$, where $f_{CPW}$ is approximately equal to an integer sub-harmonic of $f_{CC3}/196$.

* * * * *